INVENTOR.
WILLIAM C. STURGILL
BY
McMorrow, Berman & Davidson
ATTORNEYS

July 29, 1958  W. C. STURGILL  2,845,148
EMERGENCY BRAKE FOR TRAILERS
Filed July 31, 1956  3 Sheets-Sheet 2
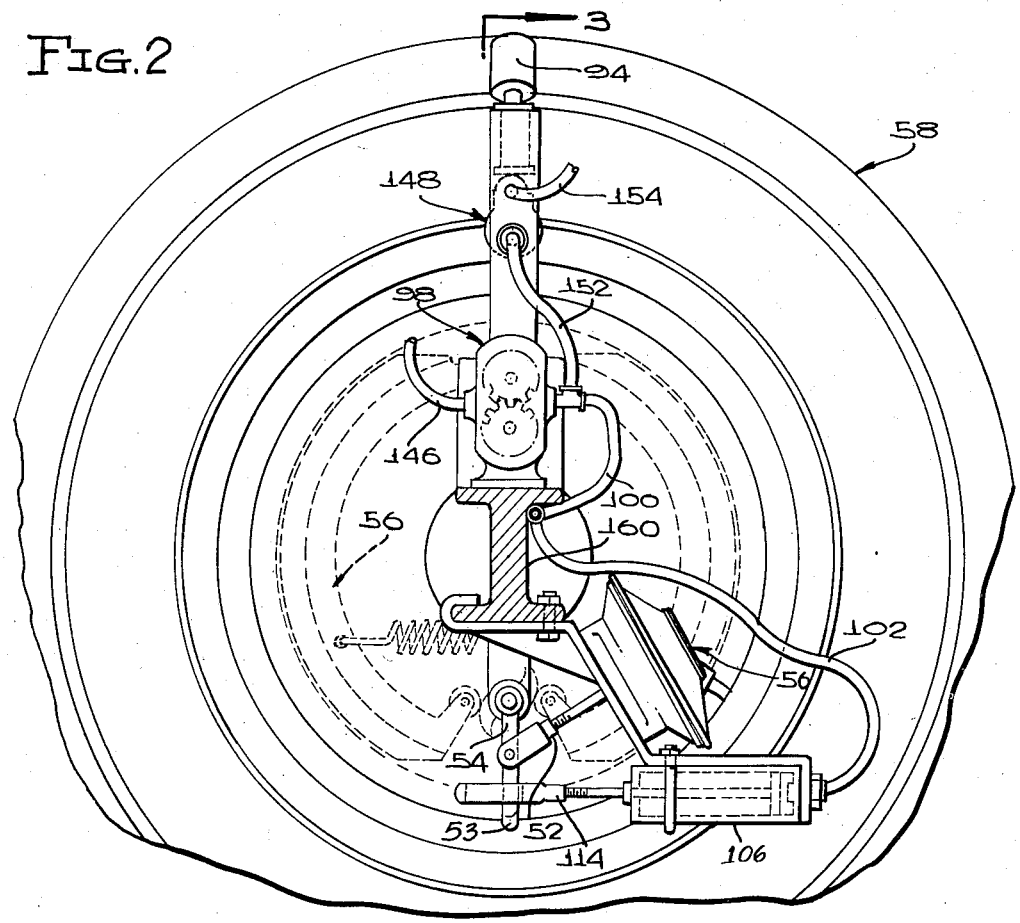
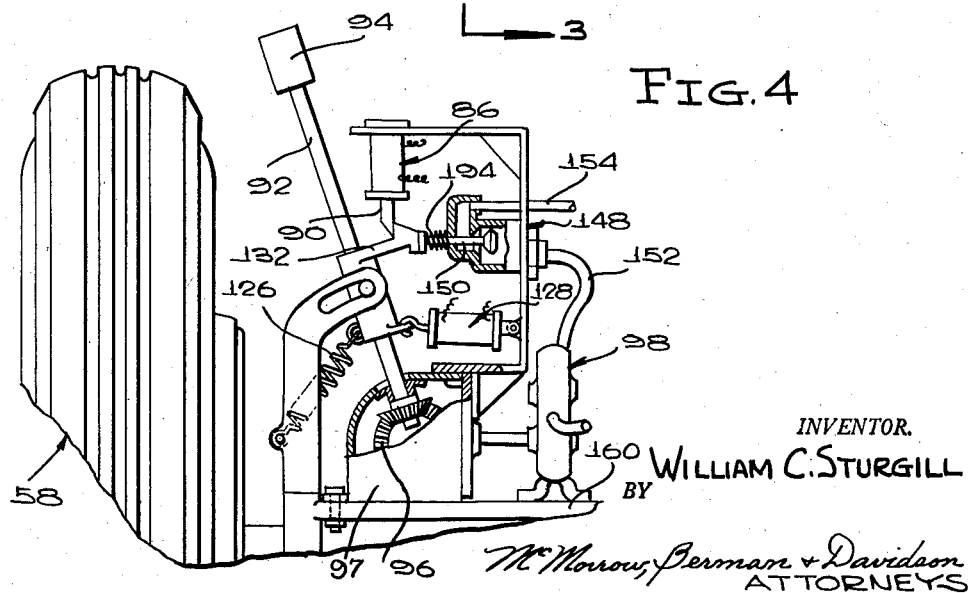
INVENTOR.
WILLIAM C. STURGILL
BY McMorrow, Berman + Davidson
ATTORNEYS

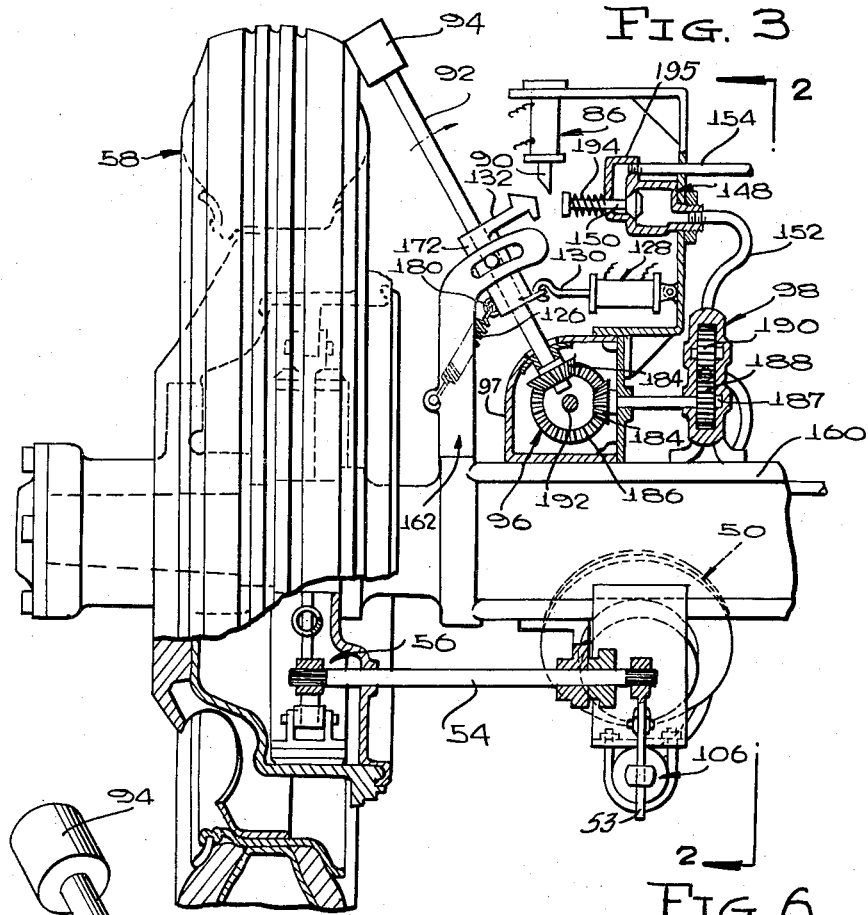
Fig. 3
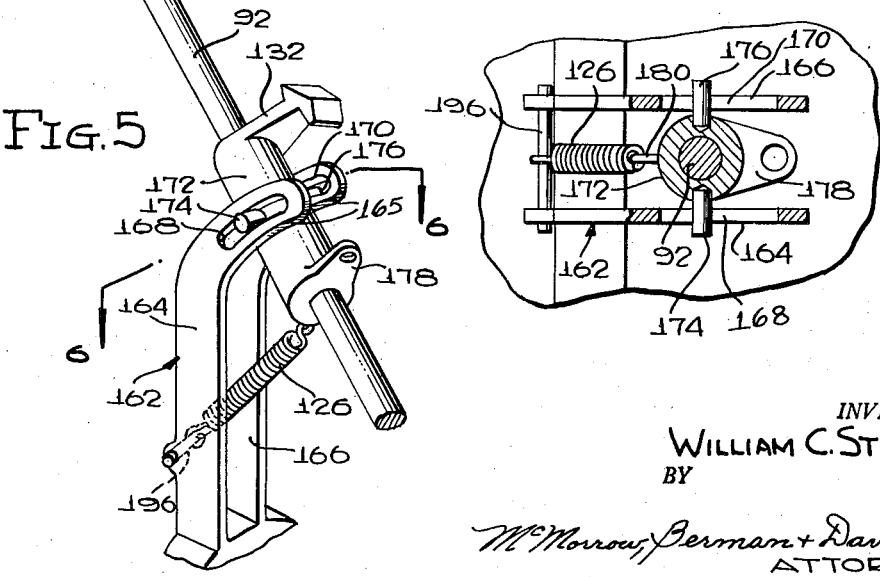
Fig. 5
Fig. 6
INVENTOR.
WILLIAM C. STURGILL
BY
McMorrow, Berman + Davidson
ATTORNEYS United States Patent Office 2,845,148
Patented July 29, 1958

2,845,148

EMERGENCY BRAKE FOR TRAILERS

William C. Sturgill, Columbia, S. C.

Application July 31, 1956, Serial No. 601,224

3 Claims. (Cl. 188—152)

This invention relates to an improved automatic brake system for tractor-trailer assemblies, of the type which acts to apply the brakes of the trailer whenever the brakes fail while the assembly is parked on a hill, and to apply the brakes of the trailer whenever the pressure in the system falls below a predetermined level as the brakes are applied by the operator of the tractor.

The primary object of the invention is to provide an emergency pneumatic or hydraulic brake mechanism which can be readily incorporated in a conventional pressure actuated trailer brake system, which serves the above mentioned emergencies, and which is actuated by vagrant rotation of a wheel or wheels of the trailer so as to provide brake-actuating pressure.

Another object of the invention is to provide a more practical and efficient emergency brake mechanism of the character indicated above which involves a unit mounted adjacent to each brake-equipped trailer wheel, which has an outboardly swingable shaft for engaging the wheel upon brake system failure, this shaft being operatively connected to an auxiliary pump for supplying braking pressure, and releasable electrically operable retracting and latching means for the shaft.

Another object of the invention is to provide emergency brake mechanism of the character indicated, which can be made in rugged and serviceable forms at relatively low cost, is easily installed, is easily maintained and used, and is highly satisfactory, practical and utilitarian for the purpose intended.

These together with other objects and advantages which will become apparent reside in the details of construction and operation as more fully hereinafter described and claimed, reference being had to the accompanying drawings forming a part hereof, wherein like numerals refer to like parts throughout the several views, and in which:

Figure 2 is an inboard side elevational view, partially in section, of a trailer wheel and axle with which the emergency brake mechanism is associated, as seen from line 2—2 of Figure 3;

Figure 3 is a vertical transverse sectional view taken substantially on line 3—3 of Figure 2 and partly broken away;

Figure 4 is a fragmentary view similar to Figure 3, showing the parts in retracted form the operative positions shown in Figure 3;

Figure 5 is an enlarged fragmentary perspective view of the wheel-driven shaft and its mounting; and Figure 6 is a fragmentary horizontal sectional view taken substantially on line 6—6 of Figure 5.

Figure 1:
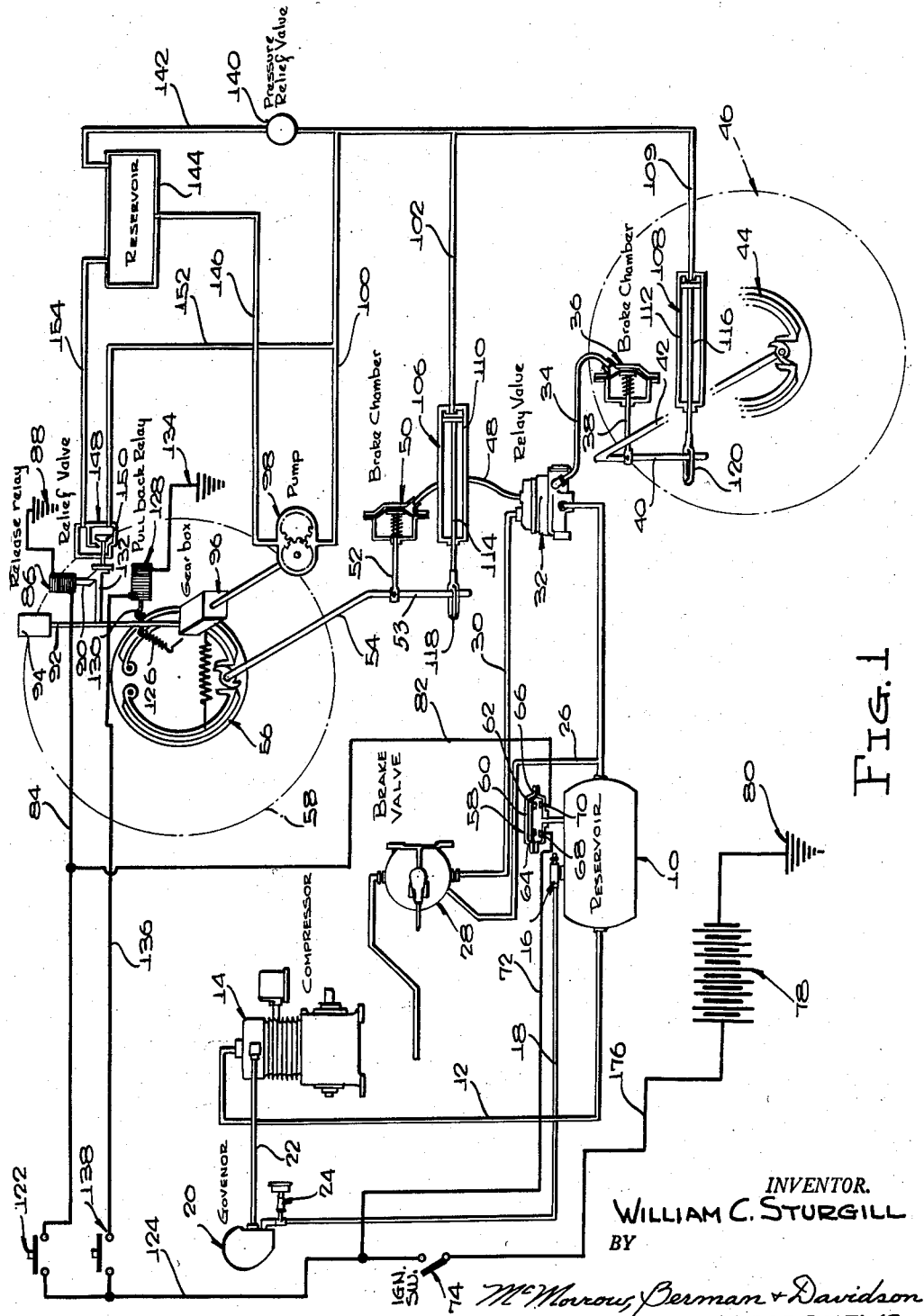
Figure 1 is a schematic view of a conventional trailer braking system having incorporated therein an emergency brake mechanism of the present invention.

Referring to the drawings in detail, and first to Figure 1, showing a conventional fluid pressure trailer braking system, indicated generally at 10 is a fluid pressure reservoir in communication through a pressure conduit 12 with the output side of a compressor 14 for building up pressure in said reservoir. The reservoir 10 is also in communication with a pressure responsive control valve 16 connected by means of a conduit 18 to a governor 20 which in turn communicates by means of a conduit 22 with the intake side of the compressor 14, so that the pressure indicated by the gauge 24 is maintained at a predetermined level in the reservoir 10. The reservoir 10 communicates by means of a conduit 26 with a brake valve, indicated generally at 28, which is located in the cab of a tractor (not shown) to which the trailer is hitched, and is in turn connected by means of a conduit 30 to a relay valve, indicated generally at 32. The outlet side of the relay valve 32 is connected by means of a first conduit 34 to a first fluid pressure responsive brake actuator, indicated generally at 36, which is operatively connected by means of a rod 38 to the lateral arm 40 on a first brake applying rod 42 which has one end thereof means for applying the wheel brake shoe assembly 44 for the trailer wheel 46. The relay valve 32 also communicates through a conduit 48 with a second brake actuator, indicated generally at 50. The second actuator 50 has a rod 52 operatively connected to the lateral arm 53 of a second brake applying rod 54, similar to the rod 52, which, when rotated applies the wheel brake shoe assembly 56 of the other trailer wheel 58.

The above described structure is conventional, and it is obvious that should any one of the pressure lines between the reservoir 10 and the brake actuators be ruptured, or should the pressure in the reservoir 10 drop below a predetermined level insufficient to actuate the brakes of the trailer, the trailer brakes do not hold, and the trailer is freed to roll, as down a hill, from a parked position. In accordance with the present invention, these failures are prevented from releasing the trailer brakes, by incorporation in the trailer brake system of emergency brake mechanism hereinafter described.

The illustrated emergency brake mechanism comprises a pressure responsive switch 58 which has a casing 60 having a diaphragm 62 extending across the interior thereof, having thereon a pair of movable electrical contacts 64 and 66 which are retained in spaced relationship from a pair of stationary contacts 68 and 70, respectively, when the pressure in the reservoir 10 is above a predetermined level. The stationary contact 68 is connected by a wire 72 to one side of a switch 74, preferably incorporated in the ignition switch of the tractor, by means of a wire 76 to the ungrounded side of the tractor battery 78 which is grounded at 80 to the tractor chassis. The stationary contact 70 is connected by a wire 82 to a wire 84 which is connected between the ungrounded side of a solenoid 86 which is grounded at 88, and a switch 138. Thus when pressure drops below a predetermined level in the reservoir 10, the diaphragm 62 moves downwardly so that the movable electrical contacts 64 and 66 engage the stationary contacts 68 and 70, and close an electrical circuit to the solenoid 86. When this occurs an armature lath bar 90 is moved upwardly so that a swingable wheel-driven shaft 92 having thereon a wheel-engaging drum 94 is freed to be moved into engagement with the inboard side of the trailer wheel 58, so that the shaft 92 is rotated by the wheel. The wheel-driven shaft 92 is connected by means of a suitable gearing 96 to a pump 98, for forcing fluid pressure through a pipe 100 to branch line 102 and 109 which are severally connected to fluid motors 106 and 108, respectively, which include cylinders 110 and 112, respectively, piston and rod assemblies 114 and 116, respectively, whose rods are severally connected at 118 and 120 to the lateral arms of the brake applying rods 54 and 52, respectively. Extension of the piston and rod assemblies 114 and 116 results in application of the wheel brakes.

The emergency brake mechanism further comprises a manually operable switch 122, to be located in the cab of the tractor, for closing and opening a circuit between a wire 124 having therein the switch 74, and connected at one end to the battery 78 by the wire 176, and at its other end to the wire 84 which is connected to the solenoid 86, and has therein the switch 122. The switch 122 is closed while the trailer is parked on a hill, for example, and the latch bar 90 is retracted so that the friction drum 94 is engaged with the wheel 58, as above described, so that should the conventional emergency brake of the trailer fail, the wheel brakes of the trailer will be applied, as an incident to movement of the trailer and accompanying rotation of the wheel 58.

Stretched between the shaft 92 and an axle mounted bracket 162 is a coil spring 126 which urged the arm 92 in an outboard direction into engagement with the wheel 58. A second solenoid, indicated generally at 128, controls a reciprocable armature rod 130 which is operatively connected to the shaft 92 and which is operative to retract the shaft 92 inwardly to a latched position, against the resistance of the spring 126, wherein a dog 132 on the shaft 92 engages the latch bar 90. One side of the solenoid 128 is grounded at 134 and its other side is connected by a wire 136 to the wire 124 through a manually operable reset switch 138, located in the cab of the tractor.

The line 100 of the auxiliary pump 98 has therein a conventional pressure relief valve 140 for preventing rupture of the lines of the system, which is connected by a line 142 to an auxiliary fluid reservoir 144. The auxiliary reservoir 144 is connected to the intake side of the pump 98 by a line 146. An auxiliary relief valve, indicated generally at 148 includes valve means 150 which is closed to prevent communication between a line 152, which communicates with the output side of the pump 98 through the line 100, with a line 154 which communicates with the reservoir 144, when the solenoid 86 is actuated. Engagement of the dog 132 with the latch bar 90 of the solenoid 86 is accompanied by opening of the relief valve 148, which provides communication between the lines 152 and 154, as to relieve pressure which has been built up in the fluid motors 106 and 108, and thereby release the brakes of the trailer by their retracting springs, and by the return springs of the brake actuators 36 and 50.

As shown in Figures 2 through 6, the trailer axle 160 has mounted thereon an upstanding bracket 162 which has upstanding legs 164 and 166 on its upper end which terminate at their upper ends in arcuate portions 165 having therein arcuate slots 168 and 170, respectively. The wheel-driven shaft 92 is fixedly journalled in a sleeve 172 which has diametrically opposed trunnions 174 and 176 slidably engaged in the respective slots 168 and 170. The sleeve 172 has on its upper end the dog 132, and has on its lower end a laterally extending apertured ear 178 which is engaged with the rod 130 of the solenoid 128. Extending from the underside of the sleeve 172 is a hook 180 to which is connected one end of the retracting spring 126, whose other end is connected to the bracket 162, as indicated at 196. The lower end of the shaft 92 extends into the gear box 97 and has thereon a bevel pinion 184, see Figure 3, in mesh with a bevel gear 186 which is in mesh with a bevel gear 98 driving the pump gear 188 which is meshed with the pump gear 190.

As clearly seen in Figures 3 and 4, the valve 150 of the relief valve 148, is normally closed, so as to close communication between the lines 152 and 154, by a compression spring 194 which is circumposed on a portion of the valve 150 which extends out of the casing 195.

The foregoing is considered as illustrative only of the principles of the invention. Since numerous modifications and changes will readily occur to those skilled in the art, it is not desired to limit the invention to the exact construction and operation shown and described, and accordingly all suitable modifications and equivalents may be resorted to, as fall within the scope of the appended claims.

What is claimed is:

1. In combination, a vehicle including a support, a ground-engaging wheel journaled on said support having an inboard side, a brake incorporated in said wheel having an applying rod extending inboardly from the wheel, a bracket fixed on said support at the inboard side of the wheel, a vertical sleeve slidably and pivotally mounted on said bracket for rocking movement toward and away from the inboard side of the wheel, a wheel-driven shaft fixedly journaled in said sleeve and having outboard and inboard ends, a friction drum fixed on the outboard end of said shaft, gearing mounted on said support with which the inboard end of said shaft is operatively connected, an auxiliary pump driven by said gearing, a fluid pressure operated brake actuator fed by said pump, means operatively connecting said actuator to said brake applying rod, spring means yieldably urging said wheel-driven shaft in an outboard direction to engage said friction drum with the wheel, retracting means connected to said shaft operable to retract the shaft from wheel engaging position against the resistance of said spring means, latch means for latching said shaft in an inboard retracted position comprising a dog on said shaft and a retractable latch bar with which said dog is engageable as the shaft is retracted, operating means for said latch bar and said retracting means, valve means connected between said auxiliary pump and said reservoir including a valve which is open when said shaft is in the retracted position and which is closed when said shaft is in the wheel engaging position and permitting fluid pressure to return from said auxiliary brake actuator when said brakes are to be released, said valve having a portion engageable by said dog to open the valve as the wheel-driven shaft is moved toward retracted position, and an auxiliary pressure reservoir in circuit with said pump and said valve means.

2. In combination, a vehicle including a support, a ground-engaging wheel journaled on said support having an inboard side, a brake incorporated in said wheel having an applying rod extending inboardly from the wheel, a bracket fixed on said support at the inboard side of the wheel, a vertical sleeve slidably and pivotally mounted on said bracket for rocking movement toward and away from the inboard side of the wheel, a wheel-driven shaft fixedly journaled in said sleeve and having outboard and inboard ends, a friction drum fixed on the outboard end of said shaft, gearing mounted on said support with which the inboard end of said shaft is operatively connected, an auxiliary pump driven by said gearing, a fluid pressure operated brake actuator fed by said pump, means operatively connecting said actuator to said brake applying rod, spring means yieldably urging said wheel-driven shaft in an outboard direction to engage said friction drum with the wheel, retracting means connected to said shaft operable to retract the shaft from wheel engaging position against the resistance of said spring means, latch means for latching said shaft in an inboard retracted position comprising a dog on said shaft and a retractable latch bar with which said dog is engageable as the shaft is retracted, operating means for said latch bar and said retracting means, valve means connected between said auxiliary pump and said reservoir including a valve which is open when said shaft is in the retracted position and which is closed when said shaft is in the wheel engaging position and permitting fluid pressure to return from said auxiliary brake actuator when said brakes are to be released, said valve having a portion engageable by said dog to open the valve as the wheel-driven shaft is moved toward retracted position, and an auxiliary pressure reservoir in circuit with said pump and said valve means, said operating means comprising an armature portion on said latch bar and a latch solenoid in which said armature portion is operatively engaged and a retracted solenoid having an armature rod connected to said wheel-driven shaft.

3. In combination, a vehicle including a support, a ground-engaging wheel journaled on said support having an inboard side, a brake incorporated in said wheel having an applying rod extending inboardly from the wheel, a bracket fixed on said support at the inboard side of the wheel, a vertical sleeve slidably and pivotally mounted on said bracket for rocking movement toward and away from the inboard side of the wheel, a wheel-driven shaft fixedly journaled in said sleeve and having outboard and inboard ends, a fixed drum fixed on the outboard end of said shaft, gearing mounted on said support with which the inboard end of said shaft is operatively connected, an auxiliary pump driven by said gearing, a fluid pressure operated brake actuator fed by said pump, means operatively connecting said actuator to said brake applying rod, spring means yieldably urging said wheel-driven shaft in an outboard direction to engage said friction drum with the wheel, retracting means connected to said shaft operable to retract the shaft from wheel engaging position against the resistance of said spring means, latch means for latching said shaft in an inboard retracted position comprising a dog on said shaft and a retractable latch bar with which said dog is engageable as the shaft is retracted, operating means for said latch bar and said retracting means, valve means connected between said auxiliary pump and said reservoir including a valve which is open when said shaft is in the retracted position and which is closed when said shaft is in the wheel engaging position and permitting fluid pressure to return from said auxiliary brake actuator when said brakes are to be released, said valve having a portion engageable by said dog to open the valve as the wheel-driven shaft is moved toward retracted position, and an auxiliary pressure reservoir in circuit with said pump and said valve means, said operating means comprising an armature portion on said latch bar and a latch solenoid in which said armature portion is operatively engaged and a retracting solenoid having an armature rod connected to said wheel-driven shaft, and a pressure actuated braking system which includes said brake actuator, said system having a reservoir connected to said actuator, a compressor connected to the reservoir, and conduit means connecting the reservoir to said actuator which includes operating valve means actuable to apply and release said actuator independently of said auxiliary valve and said auxiliary pump, and electrical relay valve means connected in said conduit means between said brake actuator and the system reservoir and the auxiliary reservoir, said relay valve means being actuable by a drop in pressure in said conduit means and in said system reservoir to energize said latch solenoid and de-energize said retracting solenoid so as to enable said spring of the wheel-driven shaft to move the wheel-driven shaft to engage the friction drum with the wheel.

References Cited in the file of this patent
UNITED STATES PATENTS

| | | |
|---|---|---|
| 2,185,667 | Hines | Jan. 2, 1940 |
| 2,190,120 | Kohler | Feb. 13, 1940 |
| 2,645,313 | Schaadt | July 14, 1953 |
| 2,680,500 | Jenkins | June 8, 1954 |
| 2,780,322 | Hickle | Feb. 5, 1957 |